April 18, 1961 W. D. VAN ZELM ET AL 2,980,213
ENERGY ABSORPTION UNIT
Filed Feb. 17, 1958 3 Sheets-Sheet 1
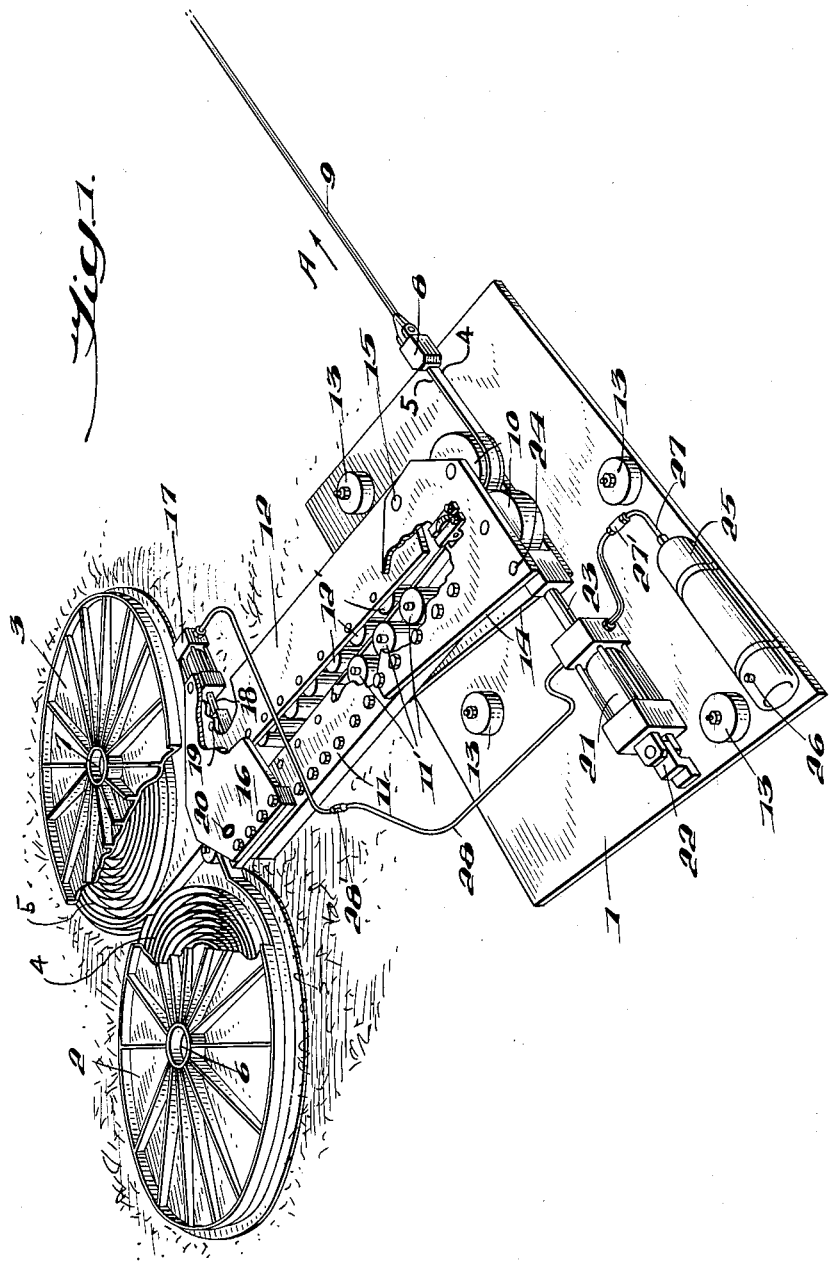
INVENTORS
WILLEM D. VANZELM,
MARTIN A. JACKSON
BY Stevens, Davis, Miller + Mosher
ATTORNEYS

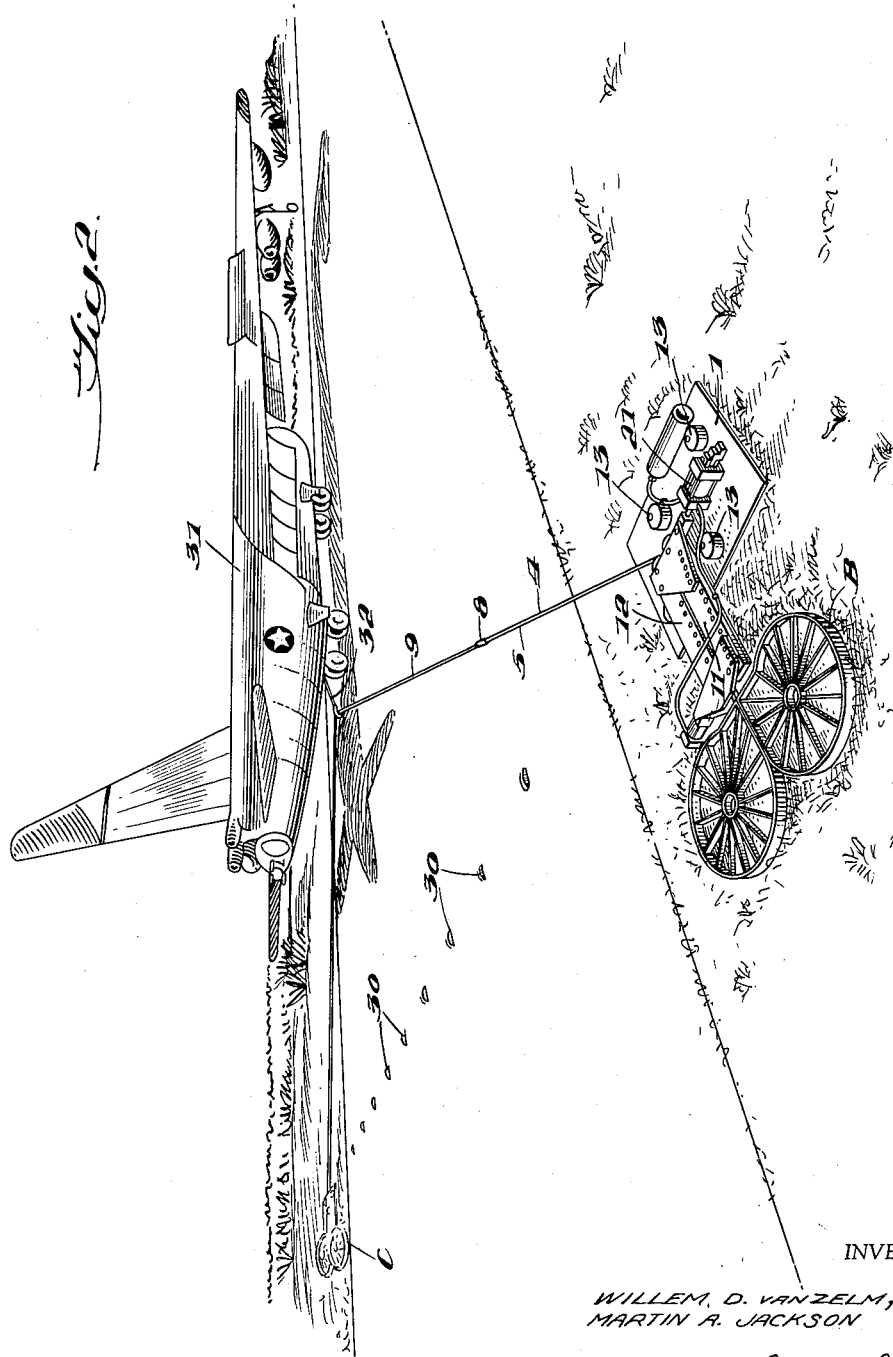

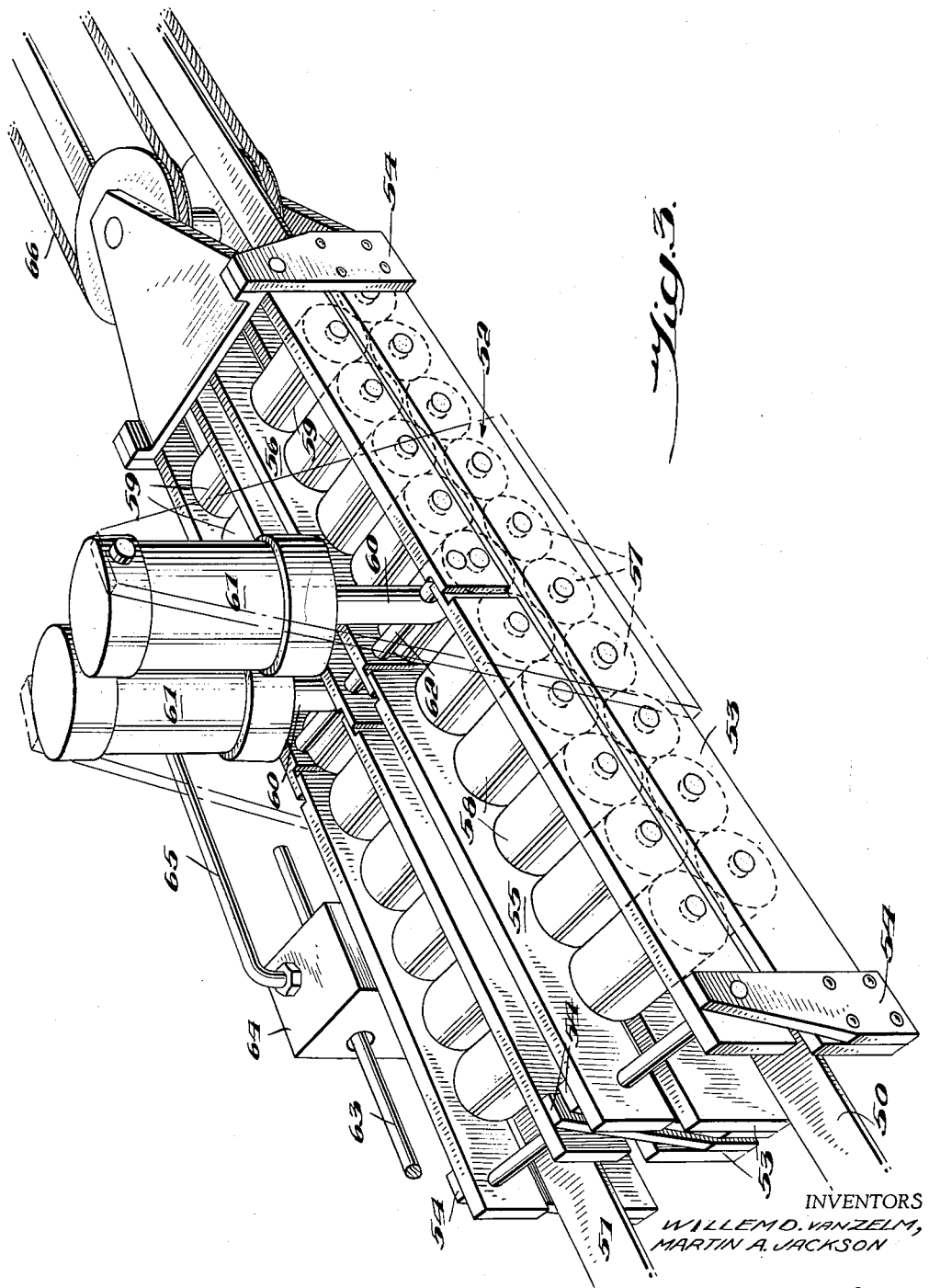

United States Patent Office 2,980,213
Patented Apr. 18, 1961

2,980,213
ENERGY ABSORPTION UNIT

Willem D. Van Zelm, Ruxton, and Martin A. Jackson, Bradshaw, Md., said Jackson assignor to Van Zelm Associates Inc., Baltimore, Md., a corporation of Maryland Filed Feb. 17, 1958, Ser. No. 715,579

11 Claims. (Cl. 188—1)

This invention relates to a device for the absorption of kinetic energy by the plastic deformation of a strip or bar of metal beyond its yield point. There are many applications for an energy absorber which may amount, more or less, to emergency use. That is, there are installations where an energy absorber having high kinetic energy absorption characteristics is required which must lie dormant between uses and require very little or no maintenance or replacement of parts, yet be fully capable of absorbing large quantities of kinetic energy when called upon.

One example of such an installation, would be an energy absorber for use in connection with an elevator system wherein, if a cable should break, the kinetic energy of the car in motion could be absorbed and the car brought to a rest or lowered at a very slow rate to the bottom of the elevator shaft.

Another example for such an energy absorber would be in connection with an overrun barrier for aircraft at the end of a runway where it may be necessary to stop the aircraft as an emergency measure, either on take-off or landing. The energy absorber of this invention can be located at the side of the runway and can be connected to absorb energy from the cross-field pendant which may either engage a tail hook or be actuated by the familiar nylon net.

Energy absorbers are known wherein hydraulic systems are employed so that energy can be absorbed by metering hydraulic fluid, or in other systems where a mass of some sort is accelerated, which eventually places a great drag upon the system to absorb kinetic energy. In the case of the hydraulic system, constant maintenance and checking are required. It is not possible to install such a system and leave it unattended and except it to be ready for operation in an emergency without constant maintenance and attendance.

It is an object of this invention to provide an energy-absorbing unit which will absorb very large amounts of kinetic energy through the phenomena of deforming strips of metal or bars of metal, progressively and successively, in increments.

It is another object of this invention to provide an energy-absorbing unit which can be left for long periods of time without maintenance or frequent checking.

It is another object of this invention to provide energy-absorbing units of very large, or very small, capacity for absorbing kinetic energy, at a very low cost.

It is another object of this invention to provide an energy-absorbing unit in which the energy-absorbing member can be discarded after use, due to its very low cost.

It is another object of this invention to provide an energy-absorbing unit which is readily adaptable to either static or dynamic mounting depending upon its use and application.

Further and other objects will be apparent from a description of the accompanying drawings in which like numerals refer to like parts.

In the drawings:

Fig. 1 shows an energy-absorbing unit in accordance with this invention;

Fig. 2 shows an energy-absorbing unit applied to an aircraft arresting gear;

Fig. 3 shows another embodiment of the energy-absorbing unit.

The energy-absorbing unit shown in Fig. 1 shows a base plate 1. Magazines 2 and 3 contain strips of metal 4 and 5 coiled therewithin. Magazines 2 and 3 are mounted for rotation about their axes 6 and 7 as strips 4 and 5 are pulled therefrom. The outer ends of strips 4 and 5 are secured to a fitting 8, which in turn is fastened to a cable 9. A frame member 11 is cut away to show rollers 11' mounted along one side of the frame member. Frame member 12 has rollers 12' mounted along one side thereof, which are in staggered relationship with respect to rollers 11'. Plate members 14 are rigidly secured to frame member 11. Frame member 12 is pivotally supported at 15 between plates 14 so that it may move with respect to frame member 11. Plate 16 is rigidly secured to frame member 11 and supports the housing of cylinder jack 17. Jack strut 18 is pivotally secured at 19 to move frame member 12 about pivot 15 with respect to frame member 11 so that rollers 12' may interfit or mesh with rollers 11'. The whole assembly of frame members 11 and 12 is pivoted to move on base plate 1 about pivot point 20.

Hydraulic cylinder 21 is pivoted on bracket 22 mounted on base plate 1. Jack strut 23 is pivoted to frame member 14 at 24. Cylinder 25 is an air oil accumulator. Air pressure charges the cylinder through valve 26 to maintain oil at a low constant pressure. Oil is fed through pipe 27 and restricting orifice 27' to cylinder 21 to maintain the piston on jack strut 23 retracted or in a position toward the pivoted end of the cylinder 21.

Oil line 28 is connected to cylinder 17. The pressure relief valve 28' in oil line 28 is such a valve that it will open for oil flow to cylinder 17 only when the pressure exceeds a predetermined amount. In this case, the pressure to open valve 28' would be slightly in excess of the pressure of the cylinder 25. The system, including line 27, cylinder 21, line 28 and cylinder 17, may be filled with hydraulic fluid, but only that portion up to the pressure relief valve 28' will be under the relatively low pressure from the accumulator 25.

It will be seen therefore, that if a sudden load is placed upon cable 9, fitting 8 will move in the direction of arrow A, taking with it metal strips 4 and 5 as they pass over sheave 10. Strips 4 and 5 are under the restraint of the inertia of the reels of such strips in magazines 2 and 3 and a small amount of pre-tension due to some of the rollers of the sets of rollers 11' and 12' near pivot point 15 being slightly engaged with the strips. The movement of cable 9 and fitting 8 will therefore be resisted by the pre-tension and the inertia of the reels, and, consequently, the whole assembly of frame members 11 and 12 will be moved about pivot 20 on base 1 suddenly in the direction of arrow A. Strut 23 of the piston in cylinder 21 will move in the same direction, displacing the fluid in cylinder 21. Restricting orifice 27' is so designed that the fluid will not return to cylinder 25, but instead, will pass through line 28 and open relief valve 28', and fill cylinder 17 with hydraulic fluid under considerable pressure due to the energy exerted on cable 9. The fluid pressure in cylinder 17 will cause strut 18 to move in the opposite direction to the movement of cable 9 and move frame member 12 with respect to frame member 11. Rollers 12' will interfit or mesh with rollers 11' on frame member 11 throughout the length of the sets of rollers, and successively deform increments of metal strips 4 and 5 which will thereafter absorb a considerable amount of energy. Cable 9 will pay out, continuously absorbing the energy exerted thereon through the plastic deformation of the metal of strips 4 and 5, beyond its yield point.

It is to be understood that in installations where there is any likelihood of rust or corrosion, the whole unit or parts thereof may be enclosed and oil filled.

The plate 1 must be anchored to withstand the transverse load. Accordingly, anchoring means 13 are provided, which may be some form of bolt extending through plate 1 into a suitable fastening in the ground.

An application of the unit described above is shown in Figure 2, wherein energy absorbing units B and C are mounted on opposite sides of a runway. The cross-field arresting cable or pendant 9 is spaced from the ground by spacers 30. Should aircraft 31 fail to stop at the end of a runway upon landing, or having taken off, find it necessary to land within the length of the runway, tail hook 32 may be lowered to engage cross-field arresting cable 9 and the energy of the aircraft will be absorbed in the metal strips 4 and 5. Depending upon the installation and the load required to be arrested, the type of unit and the number of strips will be determined. As illustrated in Figure 2, it can be seen that with four magazines and a mass of metal arranged as four metal strips, over a hundred million foot-pounds of energy can be absorbed. If a low carbon steel strip is employed (costing approximately 16¢ a pound), such a strip will absorb about 16,000 foot-pounds of energy per pound of strip. It can readily be seen, therefore, that with four strips, an aircraft weighing over 100,000 pounds, traveling at 150 knots, can be arrested and saved from destruction at a cost of $1,000.00. It should be further understood that with the arrangement of sheaves 10 on each side of strips 4 and 5, the energy absorber can be positioned as shown in Fig. 2, or cable 9 may extend in a position 90° from that shown in Fig. 1, or, in other words, strips 4 and 5 may extend generally parallel with the frame members 11 and 12 until cable 9 is displaced, in which case strips 4 and 5 will pass over either of sheaves 10.

Fig. 3 shows another embodiment of the invention wherein energy absorbing strips 50 and 51 extend longitudinally of the installation and are fixed while a frame generally indicated as 52 carrying a plurality of rollers moves with respect to metal strips 50 and 51. Frame members 53 have secured on each end, brackets 54 on which are pivoted frame members 55 and 56. Frame members 53 support rollers 57 while frame members 55 and 56 support sets of rollers 58 and 59, which intermesh or interfit with rollers 57. Frames 55 and 56 are held in spaced relationship with respect to frames 53 by cylinders 61, struts 60, and transverse pin 62. The pistons of cylinders 61 are biased in the up position by a spring or other means. Cables 63 and 66 may be part of the cable suspension of an elevator or of a crane. Main cable 63 passes through hydraulic unit 64 where the tension in cable 63 holds closed a hydraulic valve, leading from an accumulator in unit 64, to preclude the flow of hydraulic fluid through pipe 65 to cylinders 61 as long as tension is maintained in cable 63. Should cable 63 become slack, indicating a failure or breakage of a cable in the system, hydraulic fluid will flow from unit 64 through pipe 65 to cylinders 61; moving struts 60 downwardly and causing the rollers 57, 58 and 59 to interfit or mesh, and as frame assembly 52 moves along 50 and 51, a plastic deformation of the strips 50 and 51 will take place and the kinetic energy of the assembly 52 will be absorbed by these strips.

It can be seen from the above that there are a great many applications for an energy absorber where relatively inexpensive strips of metal may be maintained in a unit on a stand-by basis. It is merely necessary to provide the unit with a means to engage and deform the strips of metal progressively and successively as motion takes place between the strips of metal and the unit; so that by the working of the metal, energy may be absorbed. Tremendous quantities of energy can be absorbed and when the strips have served their purpose, their low cost warrants their being discarded and replaced with new strips.

While two applications of the energy-absorbing unit have been described, they are merely examples of possible uses and are not to be considered as limitations upon the broad aspects of this invention. Furthermore, it is to be understood that certain changes, alterations, modifications and substitutions may be made within the spirit and scope of the appended claims.

We claim:

1. An energy-absorbing device comprising an elongated strip of metal, frame means mounted on each side of said strip, one of said metal strip and frame means being adapted for connection to a moving load to be retarded, said frame means having means pivotally mounted thereon to engage said strip to progressively and successively deform increments of said strip by bending beyond the elastic limit of said metal, and means connected to said frame means and responsive to the loading on said one of said metal strip and frame means to apply a portion of the kinetic energy of the moving load to be absorbed to effect lateral relative motion between said strip and said frame means to effect absorption of the remainder of said kinetic energy therebetween by said pivotally mounted means.

2. An energy-absorbing device comprising elongated metal strip means, a frame means mounted on each side of said strip, one of said metal strip and frame means being adapted for connection to a moving load to be retarded, said frame means having means pivotally mounted and offset on opposite sides of said strip to mesh and to effect a progressive and successive deformation of increments of said strip by bending beyond the elastic limit of said metal, means to control the relative motion of the sides of said frame means, and means connected to said frame means and responsive to the loading on said one of said metal strip and frame means to apply a portion of the kinetic energy to be absorbed to effect relative lateral motion between said strip and said frame means to effect absorption of the remainder of said kinetic energy therebetween by said pivotally mounted means.

3. An energy-absorbing device comprising an elongated metal strip, a frame means mounted on each side of said strip, one of said metal strip and frame means being adapted for connection to a moving load to be retarded, each said frame means having sets of rollers pivotally mounted thereon, said two sets of rollers being offset along said strip so that the axes of the rollers of one set are positioned between the axes of the rollers of the other set, so that when said rollers engage said strip successive increments of said strip are progressively deformed by bending beyond the elastic limit of said metal, means responsive to the loading on said one of said metal strip and frame means to effect relative motion of the opposite sides of said frame means toward one another and as kinetic energy is applied by the moving load to effect relative motion between said frame means and said strip, and means connected to said frame means and responsive to the loading on said one of said metal strip and frame means to apply a portion of the kinetic energy of the moving load to effect relative motion between said strip and said frame means to absorb the remainder of said kinetic energy therebetween by the action of said sets of rollers.

4. An energy absorber comprising an elongated strip of metal, deforming means including a plurality of rollers thereon to engage said metal strip to progressively and successively deform increments of said metal strip by bending beyond the elastic limits thereof, one of said strip and deforming means being adapted for connection to a load to be retarded, and means connected to said deforming means and responsive to the loading on said one of said strip and deforming means to apply a portion of the kinetic energy to be absorbed to said strip to effect lateral relative motion between said strip and said deforming means.

5. An energy-absorbing device comprising an elongated strip of metal, frame means mounted on each side of said strip, said strip being adapted for connection to a load to be retarded, said frame means having staggered laterally extending pivoted means thereon to engage said strip to progressively and successively deform increments of said strip by bending beyond the elastic limit of said metal, and means connected to said frame means and responsive to the loading on one of said strip and deforming means to effect lateral relative motion between said strip and said frame means whereby said device is caused to absorb kinetic energy therebetween.

6. An energy absorber comprising an elongated strip of metal, deforming means to engage said strip to progressively and successively deform increments of said strip by bending beyond the elastic limit of said metal, one of said strip and deforming means being adapted for connection to a load to be retarded, and means connected to said deforming means and responsive to the loading on said one of said strip and deforming means to effect relative lateral motion between said strip and said deforming means in response to the kinetic energy to be absorbed.

7. An energy-absorbing device comprising an elongated strip of metal, frame means mounted on each side of said strip, one of said metal strip and frame members being adapted for connection to a moving load to be retarded, said frame means having staggered roller means pivotally mounted thereon to engage said strip to progressively and successively deform increments of said strip by bending beyond the elastic limit of said metal, means connected to said frame means and responsive to the loading on said one of said metal strip and frame means to apply some of the kinetic energy to be absorbed to effect relative lateral motion between said strip and said frame means whereby the remainder of said kinetic energy therebetween is absorbed by the action of said rollers on the strip.

8. An energy-absorbing device comprising an elongated metal strip, a frame means mounted on each side of said strip, one of said metal strip and frame members being adapted for connection to a moving load to be retarded, said frame means having staggered roller means mounted pivotally on opposite sides of said strip in longitudinal offset relation to mesh and to effect a progressive and successive deformation of increments of said strip by bending beyond the elastic limit of said metal, means connected to said frame means and responsive to the loading on said one of said metal strip and frame means to control the relative motion of the sides of said frame means toward one another, said last mentioned means including means to apply a portion of the kinetic energy of the moving load to effect relative motion between said strip and said frame means to cause said staggered roller means to absorb said kinetic energy.

9. An energy-absorbing device comprising an elongated metal strip, a frame means mounted on each side of said strip, one of said metal strip and frame means being adapted for connection to a moving load to be retarded, each said frame means having sets of rollers mounted thereon, said two sets of rollers being offset along said strip so that the axes of the rollers of one set are positioned between the axes of the rollers of the other set, so that when said rollers engage said strip successive increments of said strip are progressively deformed by bending beyond the elastic limit of said metal, hydraulic means to effect relative motion of the opposite sides of said frame means toward one another as kinetic energy is applied to said strip to effect relative motion between said frame means and said strip, and actuating means connected to the frame means and responsive to the load to apply a portion of the load's kinetic energy to actuate said hydraulic means to effect relative motion between said strip and said frame means to cause said sets of rollers to absorb the remainder of said kinetic energy therebetween.

10. An energy absorber comprising in combination, elongated metal strip means, means for deforming adjacent increments of said elongated metal strip means, one of said elongated metal strip means and said deforming means being adapted for connection to a moving load whereby said strip means are caused to move relatively longitudinally with respect to the said deforming means, said deforming means having rollers offset thereon positioned adjacent opposite sides of said elongated metal strip means and mounted for relative lateral movement towards the sides of said elongated metal strip means whereby to progressively and successively deform said adjacent increments by bending beyond the elastic limit of the metal of the elongated strip means, and means connected to the frame means and responsive to the loading on one of said relatively movable metal strip means and deforming means to vary the degree of deformation of the metal strip means by the engagement of said rollers with the opposite sides of said metal strip means in proportion to the loading thereon.

11. An energy absorber comprising in combination, elongated metal strip means, means for deforming adjacent increments of said elongated metal strip means, one of said elongated metal strip means and said deforming means being adapted for connection to a moving load whereby they are caused to move relatively longitudinally with respect to each other, said deforming means having rows of rollers thereon positioned adjacent opposite sides of said elongated metal strip means and each row of rollers being axially offset relative to each other and mounted for relative transverse bodily movement towards the sides of said elongated metal strip means to interfittingly mesh whereby to progressively and successively deform said adjacent increments by bending beyond the elastic limit of the elongated metal strip means, and fluid pressure means connected to the frame means and responsive to the loading on one of said relatively movable metal strip means and deforming means to vary the engagement of said rollers with the opposite sides of said metal strip means in proportion to the loading thereon.

References Cited in the file of this patent

UNITED STATES PATENTS

| | | |
|---|---|---|
| 1,198,926 | Kemp | Sept. 19, 1916 |
| 1,340,146 | Blake | May 18, 1920 |
| 1,451,493 | Cruickshank | Apr. 10, 1923 |
| 2,483,655 | Schultz | Oct. 4, 1949 |
| 2,682,931 | Young | July 6, 1954 |
| 2,762,586 | Van Zelm | Sept. 11, 1956 |

FOREIGN PATENTS

| | | |
|---|---|---|
| 472,071 | Canada | Mar. 13, 1951 |
| 11,866 | Great Britain | of 1887 |